United States Patent [19]

Mueller et al.

[11] Patent Number: 5,051,201

[45] Date of Patent: Sep. 24, 1991

[54] PREPARATION OF FINELY DIVIDED HEXAGONAL FERRITE POWDER

[75] Inventors: Michael W. Mueller, Plankstadt; Ekkehard Schwab, Neustadt; Volker Arndt, Bobenheim-Roxheim, all of Fed. Rep. of Germany

[73] Assignee: BASF Aktiengesellschaft, Ludwigshafen, Fed. Rep. of Germany

[21] Appl. No.: 580,861

[22] Filed: Sep. 11, 1990

[30] Foreign Application Priority Data

Sep. 28, 1989 [DE] Fed. Rep. of Germany ....... 3932389

[51] Int. Cl.$^5$ ............................................. C04B 35/26
[52] U.S. Cl. .............................. 252/62.59; 252/62.63; 423/594
[58] Field of Search ............................ 423/594, 62.56; 252/62.59, 62.63

[56] References Cited

U.S. PATENT DOCUMENTS

| 3,681,010 | 8/1972 | Messier et al. | 423/594 |
| 4,548,801 | 10/1985 | Nagai et al. | 423/594 |
| 4,671,885 | 6/1987 | Gaud et al. | 423/594 |

FOREIGN PATENT DOCUMENTS

| 161767 | 11/1985 | European Pat. Off. | |
| 123445 | 8/1986 | European Pat. Off. | |
| 141558 | 8/1987 | European Pat. Off. | |
| 2-133323 | 5/1990 | Japan | 423/594 |

*Primary Examiner*—Jack Cooper
*Attorney, Agent, or Firm*—Keil & Weinkauf

[57] ABSTRACT

Finely divided hexagonal ferrite powder is prepared by autoclave treatment of an aqueous alkaline suspension containing the ferrite-forming metal ions at from 250° to 330° C. and subsequent heating of the resulting material at not more than 900° C., by a process in which the ferrite-forming metal ions are used in the form of salts melted in their water of crystallization.

2 Claims, No Drawings

PREPARATION OF FINELY DIVIDED HEXAGONAL FERRITE POWDER

The present invention relates to a process of the preparation of finely divided hexagonal ferrite powder by autoclave treatment of an aqueous alkaline suspension containing the ferrite-forming metal ions at from 250 to 330° C. and subsequent heating of the resulting material at not more than 900° C.

The preparation of hexagonal ferrites in finely divided powder form by an autoclave treatment, ie. hydrothermal synthesis, is known. Merely by way of example, the processes disclosed in European Patent Applications 123,445, 141,558 and 161,767 may be mentioned. However, the disadvantage of the known processes is an unsatisfactory space-time yield.

It is an object of the present invention to modify the known hydrothermal ferrite synthesis in such a way that it is possible to increase the space-time yield.

We have found that this object is achieved by a process for the preparation of finely divided hexagonal ferrite powder by autoclave treatment of an aqueous alkaline suspension containing the ferrite-forming metal ions at from 250 to 330° C. and subsequent heating of the resulting material at not more than 900° C., if the salts of the ferrite-forming metals ions are first melted in their water of crystallization, this molten mixture is then added to the aqueous alkali and finally the resulting suspension is subjected to the autoclave treatment.

To carry out the novel process, the metal ions forming the hexagonal ferrites, usually a modified barium, strontium or lead ferrite, are used in the form of their hydrated salts, eg. $Fe(NO_3)_3.9H_2O$, $SnCl_4.5H_2O$, $Co(NO_3)_2.6H_2O$, $Ba(OH)_2.8H_2O$ or $K_2SnO_3.3H_2O$. These salts are mechanically mixed in the proportions required for the intended ferrite, and this mixture is then heated so that a substantially homogeneous salt melt is formed. This salt melt has the special advantage that a concentrated but nevertheless substantially homogeneous mixture of the salts required for the ferrite composition is obtained. In a particularly advantageous embodiment, the melt contains the iron ions, required for ferrite formation, in a concentration of not less than 3, in particular from 4 to 15, mol/l.

This salt melt is then added to the aqueous alkali, usually sodium hydroxide. The alkali metal hydroxide or alkaline earth metal hydroxide should advantageously be dissolved in a very small amount of water, alkali concentrations of not less than 8 mol/l being particularly advantageous. After the salt melt has been mixed with the alkali, the resulting suspension is subjected to the known autoclave treatment at from 250 to 330° C. The resulting product is then filtered off, washed, dried, and heated at a temperature not exceeding 900° C. By means of this heat treatment, the ferrite intermediate formed in the hydrothermal synthesis is converted into the finely divided, well crystallized hexagonal ferrite having a mean particle size of from 0.01 to 0.3 μm and the known advantageous properties for use in magnetic recording media.

As a result of the novel modification of the known hydrothermal synthesis, it is possible to increase the space-time yield of this reaction by three times or more compared with the known procedure, and to obtain up to 26 g per liter per hour. Another advantage of the novel process is that the coercive forces of the resulting hexagonal ferrites, in particular of the barium ferrites, are lower than those of the products obtained by the known processes. These ferrites having a low coercive force nevertheless have the finely divided form which is very important precisely for their use as magnetizable material for magnetic recording media.

The Examples which follow explain the invention in more detail and compare it with prior art experiments. For the ferrite materials obtained in each case, the magnetic properties were determined by means of a vibrating sample magnetometer in a magnetic field of 400 kA/m, these properties being the coercive force $H_c$ in (kA/m) and the saturation magnetization $M_m$ in $[nTm^3/g]$. In addition, the BET specific surface area SSA in $[m^2/g]$ was determined according to DIN 66,132 by means of a Ströhlein areameter from Ströhlein Düsseldorf, FRG, by the one-point difference method according to Haul and Dümbgen.

EXAMPLE 1

3.46 mol of $Fe(NO_3)_3.9H_2O$, 0.305 mol of $SnCl_4.5H_2O$, 0.305 mol of $Co(NO_3)_2.6H_2O$ and 0.41 mol of $Ba(OH)_2.8H_2O$ were melted while stirring and while heating at 50° C. This melt was then added to a solution of 19.5 mol of NaOH in 2037 ml of water at 10° C. while stirring. The suspension thus obtained was heated to 250° C. in the course of 5 h in an unstirred autoclave and kept at this temperature for 5 h. The mixture was cooled and then filtered, and the product was washed, dried and then heated for 1 h at 800° C. The properties of the barium ferrite prepared in this manner are shown in Table 1.

112.5 g of barium ferrite were obtained per liter of autoclave volume, corresponding to a space-time yield (STY) of 7.5 g/l/h.

EXAMPLE 2

The procedure described in Example 1 was followed, except that the heating step was carried out at 850° C. The results of the measurements are shown in Table 1.

EXAMPLE 3

0.255 mol of $Fe(NO_3)_3.9H_2O$, 0.0225 mol of $SnCl_4.5H_2O$, 0.0225 mol of $Co(NO_3)_3.6H_2O$ and 0.030 mol of $Ba(OH)_2.8H_2O$ were melted while stirring and while heating at 50° C. This melt was then added to a solution of 1.0575 mol of NaOH in 50 ml of water at 10° C. while stirring. The suspension thus obtained was heated to 250° C. in the course of 2.5 h in an unstirred autoclave and kept at this temperature for 5 h. The mixture was then cooled and filtered, and the product was washed, dried and then heated for 1 h at 800° C. The properties of the barium ferrite prepared in this manner are shown in Table 1.

A volume yield of 322 g/l was achieved, corresponding to an STY of 26 g/l/h.

COMPARATIVE EXPERIMENT 1

2.27 mol of $Fe(NO_3)_3.9H_2O$, 0.2 mol of $SnCl_4.5H_2O$, 0.20 mol of $Co(NO_3)_3.6H_2O$ and 0.255 mol of $Ba(OH)_2.8H_2O$ were dissolved in 2.27 l of $H_2O$ while stirring, and the solution was added to a solution of 17.3 mol of NaOH in 2.27 l of $H_2O$ at 10° C. The suspension thus obtained was heated to 250° C. in the course of 5 h in an unstirred autoclave and kept at this temperature for 5 h. The mixture was cooled and then filtered, and the product was washed, dried and then heated for 1 h at 800° C. The properties of the barium ferrite prepared in this manner are shown in Table 1.

A volume yield of 48 g/l was achieved, corresponding to an STY of 3.2 g/l/h.

COMPARATIVE EXPERIMENT 2

0 045 mol of $Fe(NO_3)_3.9H_2O$, 0.004 mol of $SnCl_4.5H_2O$, 0.004 mol of $Co(NO_3)_3.6H_2O$ and 0.0039 mol of $Ba(OH)_2.8H_2O$ were dissolved in 45 cm$^3$ of $H_2O$ while stirring, and the solution was added to a solution of 0.45 mol of NaOH in 45 cm$^3$ of $H_2O$ at 10° C. The suspension thus obtained was heated to 250° C. in the course of 2.5 h in an unstirred autoclave and kept at this temperature for 3 h. The mixture was cooled and then filtered, and the product was washed, dried and then heated for 1 h at 800° C. The properties of the barium ferrite prepared in this manner are shown in Table 1.

A volume yield of 43.8 g/l was achieved, corresponding to an STY of 2.5 g/l/h.

COMPARATIVE EXPERIMENT 3

2.27 mol of $Fe(NO_3)_3.9H_2O$, 0.2 mol of $SnCl_4.5H_2O$, 0.2 mol of $Co(NO_3)_3.6H_2O$ and 0.2 mol of $Ba(OH)_2.8H_2O$ were dissolved in 2.27 l of $H_2O$ while stirring, and the solution was added to a solution of 22.7 mol of NaOH in 2.27 l of $H_2O$ at 10° C. The suspension thus obtained was heated to 250° C. in the course of 7.5 h in an unstirred autoclave and kept at this temperature for 10 h. The mixture was cooled and then filtered, and the product was washed, dried and then heated for 1 h at 800° C. The properties of the barium ferrite prepared in this manner are shown in Table 1.

A volume yield of 38 g/l was achieved, corresponding to an STY of 1.7 g/l/h.

10.3 parts of the stated solvent mixture consisting of equal amounts of tetrahydrofuran and dioxane, and 0.6 part of isostearic acid, 0.12 part of isobutyl stearate and 0.06 part of a commercial silicone oil were added and dispersing was continued for a further 30 minutes. The dispersion was then filtered and was applied to a polyethylene terephthalate film on a conventional coating apparatus by means of a knife coater in a thickness such that, after drying and calendering, a dry layer 4.5 μm thick resulted.

The magnetic properties measured for the tape samples, ie. the coercive force $H_c$ [kA/m], the residual induction $M_r$ in [mT] and the relative remanence $M_r/M_n$, the orientation ratio Rf, the ratio of the residual induction in the playing direction to that in the crosswise direction and the switching field distribution SFD according to Williams and Comstock (AIP Conf. Proc. 5 (1971), 738), are shown in Table 2.

COMPARATIVE EXPERIMENT BV 1

Processing of the ferrite in Comparative Experiment 1 was carried out under the same conditions as those described in Example B1. The magnetic properties measured for the tape samples are shown in Table 2.

TABLE 2

|  | $H_c$ | $M_r$ | $M_r/M_s$ | Rf | SFD |
|---|---|---|---|---|---|
| Example B1 | 67 | 81 | 0.71 | 2.6 | 0.10 |
| Comp. Expt. BV1 | 76 | 82 | 0.70 | 2.6 | 0.10 |

We claim:

1. A process for the preparation of a finely divided

TABLE 1

|  | $Fe^{3+}$ conc.* [mol/l] | Heating time [h] | Temp. constancy [h] | Cooling time [h] | Volume yield [g/l] | STY [g/l/h] | $H_c$ [kA/m] | $M_m$ [nTm$^3$/g] | SSA [m$^2$/g] |
|---|---|---|---|---|---|---|---|---|---|
| Example 1 | 4.9 | 5 | 5 | 5 | 112.5 | 7.5 | 53 | 60 | 48 |
| Example 2 | 4.9 | 5 | 5 | 5 | 112.5 | 7.5 | 44 | 58 | 42 |
| Example 3 | 12.4 | 2.5 | 5 | 5 | 322 | 26 | 24 | 59 | 50 |
| Comp. Expt. 1 | 0.87 | 5 | 5 | 5 | 48 | 3.2 | 61 | 60 | 46 |
| Comp. Expt. 2 | 0.87 | 2.5 | 3 | 5 | 43 | 2.5 | 79 | 66 | 42 |
| Comp. Expt. 3 | 0.87 | 7.5 | 10 | 5 | 38 | 1.7 | 76 | 66 | 30 |

*In the melt

EXAMPLE B1

In a mill having a capacity of 250 parts by volume and containing 100 parts by volume of glass spheres having a diameter of from 1 to 1.5 mm, 60 parts of the barium ferrite pigment obtained according to Example 1 were mixed together with 3.6 parts of a spherical $Al_2O_3$ powder having a mean particle diameter of 0.3 μm in a mixture consisting of 16.5 parts of a 13% strength solution of a thermoplastic polyester urethane obtained from adipic acid, 1,4-butanediol and 4,4'-diisocyanatodiphenylmethane in a mixture of equal amounts of tetrahydrofuran and dioxane, 9.2 parts of a 20% strength solution of a copolymer of vinyl chloride, dimethyl maleate and diethyl maleate in a mixture of equal amounts of tetrahydrofuran and dioxane, a further 41 parts of tetrahydrofuran and dioxane, and 2.7 parts of a phosphoric ester, and the mixture was dispersed for 4 hours. Thereafter, a further 26.4 parts of the stated 13% strength polyesterurethane solution, 14.8 parts of the stated 20% strength vinyl chloride copolymer solution, hexagonal ferrite powder having a mean particle size of from 0.01 to 0.3 μm comprising:

- heating in an autoclave an aqueous alkaline suspension containing ferrite - forming metal ions at from 250°-330° C. to form an intermediate ferrite material and subsequently heating said intermediate ferrite material at a temperature of not more than 900° C. to effect the formation of said finely divided hexagonal ferrite powder, said process being characterized in that hydrated salts of said ferrite-forming metal ions are mixed in proportions for said ferrite, the resultant mixture is heated to form a substantially homogenous salt melt, said salt melt being added to aqueous alkali to form said halkaline suspension and the resultant suspension is subjected to said heating at 250-330° C. in the autoclave.

2. A process as defined in claim 1, wherein the suspension contains not less than 3 moles of iron ions per liter.

* * * * *

UNITED STATES PATENT AND TRADEMARK OFFICE
CERTIFICATE OF CORRECTION

PATENT NO. : 5,051,201

DATED : September 24, 1991

INVENTOR(S) : Michael MUELLER et al.

It is certified that error appears in the above-identified patent and that said Letters Patent is hereby corrected as shown below:

<u>Claim 1, Column 4, Line 59</u>:

That part reading "halkaline" should read --alkaline--

Signed and Sealed this

Nineteenth Day of January, 1993

*Attest:*

DOUGLAS B. COMER

*Attesting Officer*      *Acting Commissioner of Patents and Trademarks*